United States Patent [19]
Summers et al.

[11] Patent Number: 6,098,133
[45] Date of Patent: Aug. 1, 2000

[54] SECURE BUS ARBITER INTERCONNECT ARRANGEMENT

[75] Inventors: Mark David Summers, Phoenix; Donald Charles Cohlman, Chandler; John Paul Sharrit, Fountain Hills; Curtis Lee Cornils, Chandler, all of Ariz.

[73] Assignee: Motorola, Inc., Schaumburg, Ill.

[21] Appl. No.: 08/980,296

[22] Filed: Nov. 28, 1997

[51] Int. Cl.$^7$ ...................................................... G06F 13/00
[52] U.S. Cl. .................... 710/107; 710/1; 710/2; 710/101; 710/104; 710/106; 710/113; 710/118; 711/163; 709/222; 709/225; 709/236; 713/200; 380/23; 380/25; 380/52
[58] Field of Search ..................... 710/107, 1, 2, 710/101, 104, 106, 113, 118; 711/163; 713/200; 709/222, 236, 225; 380/23, 25, 52

[56] References Cited

U.S. PATENT DOCUMENTS

| | | | |
|---|---|---|---|
| 4,493,021 | 1/1985 | Agrawal et al. | 709/236 |
| 4,870,704 | 9/1989 | Matelan et al. | 710/107 |
| 4,941,174 | 7/1990 | Ingham | 380/52 |
| 5,293,577 | 3/1994 | Hueske et al. | 380/25 |
| 5,396,602 | 3/1995 | Amini et al. | 710/107 |
| 5,440,698 | 8/1995 | Sindhu et al. | 709/225 |
| 5,450,551 | 9/1995 | Amini et al. | 395/299 |
| 5,535,338 | 7/1996 | Krause et al. | 709/222 |
| 5,548,646 | 8/1996 | Aziz et al. | 380/23 |
| 5,574,868 | 11/1996 | Marisetty | 710/118 |
| 5,627,967 | 5/1997 | Dauerer et al. | 713/202 |
| 5,809,261 | 9/1998 | Lambrecht | 710/128 |
| 5,812,797 | 9/1998 | Crane, Jr. et al. | 710/106 |
| 5,854,454 | 12/1998 | Upender et al. | 187/247 |
| 5,870,570 | 2/1999 | Chambers et al. | 710/113 |
| 5,909,559 | 6/1999 | So | 710/127 |
| 5,933,610 | 8/1999 | Chambers et al. | 710/113 |

Primary Examiner—Ayaz R. Sheikh
Assistant Examiner—Frantz Blanchard Jean
Attorney, Agent, or Firm—Frank J. Bogacz

[57] ABSTRACT

An apparatus is provided to handle classes of data in computer systems that must not be permitted to intermingle due to their security classifications or criticality of their data content, as in banking or safety applications. An isolated path is established for transmitting a given class of data between elements of the computer system with assurance that the data has been transmitted from the proper source, has been received by an authorized recipient and that unauthorized elements of the system have not intercepted or altered the data. Plug in type secure bus arbiter (SBA) module or bus arbiter interconnect module (10) with a controller (11) provide a way to isolate data without modification of the computer back plane or motherboard in a computer chassis (12). Modules can be used with commercial off the shelf (COTS) and non-development item (NDI) cards for a wide variety of standard computer printed circuit boards.

16 Claims, 6 Drawing Sheets

SECURE BUS ARBITER INTERCONNECT ARRANGEMENT

CROSS REFERENCED TO RELATED APPLICATION

The present application is related to U.S. Patent application Ser. No. 08/912,539 filed on Aug. 18, 1997.

BACKGROUND OF THE INVENTION

The present invention pertains to printed circuit boards and more particularly to simplify the providing of security to personal computer (PC), industrial computer or work station circuit boards with a secure bus arbiter or controller that allows or denies data access to the computer data bus.

Computer systems often handle classes of data that must not be permitted to intermingle due, for instance, to their security classifications, or for national security applications, or due to the criticality of their data content, such as in electronic transfer of money in banking applications or such as in power plant remote control for safety.

An isolated path must be established for transmitting a given class of data between elements of the computer system with assurance that the data has been transmitted from the proper source, has been received by an authorized recipient and that unauthorized elements of the system have not intercepted or altered the data.

Printed circuit boards typically have various computer functions and interface with data lines through what is called the backplane. The backplane where the card plugs into is also referred to as a motherboard.

Prior art for providing computer data line security has been to embed special controller circuitry or arbiter functions in the motherboard. The security circuitry is embedded between the printed circuit board interface and the computer data bus of the motherboard.

An arbiter function controller in the motherboard determines what cards are allowed access to the computer data bus to perform secret, classified or non-secret sensitive data handling such as money transfer, control of a nuclear reactor or similar safety related data. The arbiter function controller controls access to the computer data bus for each of the cards in secure or sensitive operations.

Each of these boards could be a different configuration and would require different treatment in the motherboard for providing secure functions. Modification of existing computer motherboards to incorporate a secure bus arbiter function would be a major undertaking.

Accordingly, it would be advantageous to have a replaceable arrangement that provides a secure bus arbiter module that is useable with all commercial off the shelf computer motherboards and backplanes. This would aid in being able to readily provide security with data lines for classified or sensitive data both when designing new data processors and especially for computers already in use.

BRIEF DESCRIPTION OF THE DRAWINGS

The invention is pointed out with particularity in the appended claims. However, other features of the invention will become more apparent and the invention will be best understood by referring to the following description in conjunction with the accompanying drawings, in which:

DESCRIPTION OF THE PREFERRED EMBODIMENT

A translation function capability is provided by the present invention to permit data to flow bidirectionally over data links. Within the limitations imposed by the requirements for compatible protocols, security, and data rates, data that is received from one link can be transmitted over other links, or multiple links.

The present invention makes for the possibility for interconnection of one or more data channels with one or more other data channels over a common bus at a mezzanine level. Thus one is able to connect any set of Data I/O channels, if the security levels are the same and their waveforms are compatible. The secure bus arbiter (SBA) module is simply inserted where the circuit board or card plugs into the computer chassis.

Separate buses (one for each class of data) can be established between elements of the computer system if needed. The bus arbiter interconnect module is used with each bus to maintain isolation. Separate buses in the past dictated custom hardware composition for the computer system elements.

The buses must have the ability to interface to the various buses for each data class. They must also incorporate logic that permits their association with certain classes of data and prohibits their association with other data classes.

In the past, separate bus also made the system less flexible if the rules governing which elements of the computer system are associated with which classes of data should change. The present invention permits a single computer data bus to be used to convey the various classes of data in a manner that ensures the different classes of data remain physically isolated from one another. The bus arbiter interconnect module ensures computer system elements not associated with a given class of data cannot read data.

The elements also can not write to the bus to insert data of a different class or corrupt the given data as it is being transported across the bus. While one class of data is being transmitted on the computer bus, only devices permitted to handle the given class of data are enabled to received this data. Devices not associated with the current class of data are prevented from accessing this particular data class.

Figure 1:
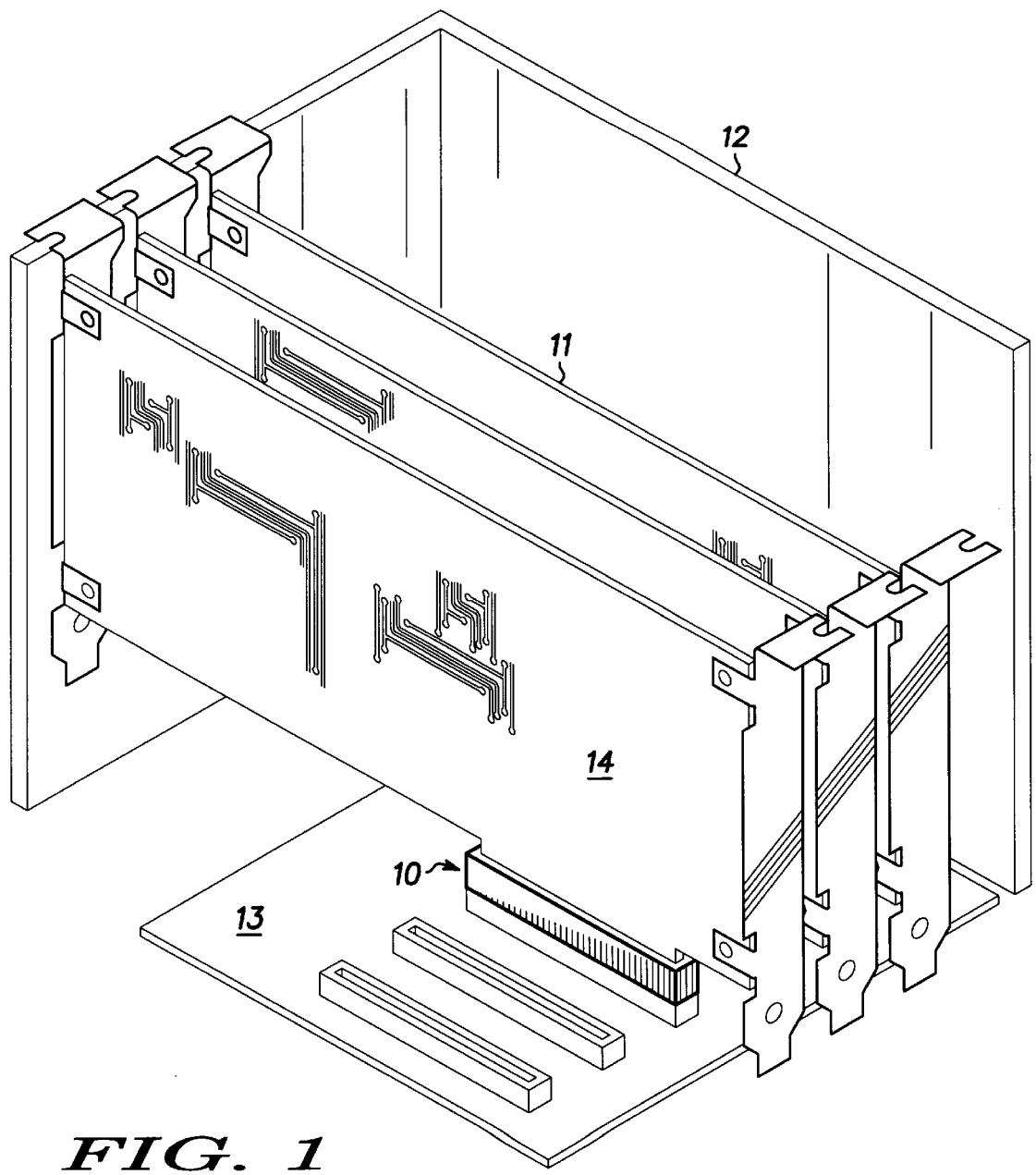
FIG. 1 is an isometric view showing standard printed circuit boards and a bus arbiter interconnect module apparatus for a computer chassis in accordance with the present invention.

FIG. 1 illustrates the secure bus arbiter (SBA) or bus arbiter interconnect module 10, with a controller 11 on a printed circuit board or standard card, a computer chassis 12, a backplane or motherboard 13 and a printed circuit board 14.

Classified or proprietary information to and from the printed circuit board 14 is controlled by the SBA module or the bus arbiter interconnect module 10. The controller 11 handles the authorization of data transfer to be controlled by the SBA module or bus arbiter interconnect module 10.

Figure 2:
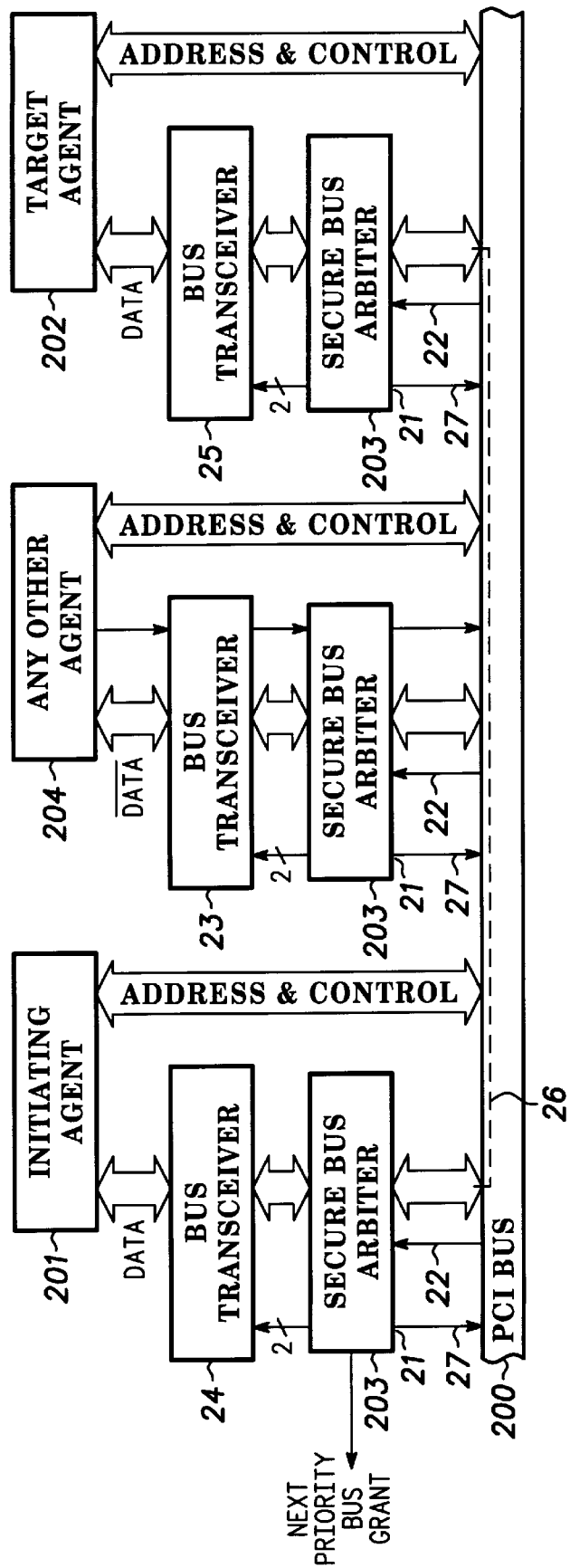
FIG. 2 is a schematic that illustrates one type of bus arbiter interconnect module to interface between printed circuit boards in accordance with the present invention.

FIG. 2 illustrates the process for a peripheral component interconnect (PCI) bus 200 data transfer. By means of its unique, bus request line 21, an initiating agent 201 calls for use of the bus for transfer of the data to a target agent 202. The bus arbiter interconnect modules 203 determine the class of data associated with the initiating agent and verifies that the target agent 202 is permitted to associate with this class of data.

If the transfer is permitted and assuming the initiating agent has the highest current priority to use the bus, the SEA grants bus access to the initiating agent 201 by activating an individual, bus grant signal 22 to initiating agent 201.

Simultaneously with or prior to granting bus access to the initiating agent 201, the SBA closes the bus transceivers 24 switch along the permitted path and opens the other bus transceivers 23 and 25 on data lines not associated with the permitted path. The secure data 26 is then transferred.

The SBA hardware in accordance with the present invention accomplishes this process in the same time that the normal hardware bus arbitration would require, that is one bus cycle. Thus bus performance is not impacted by the present invention.

Once the transfer is complete, the SBA signals the initiating agent 201 to relinquish 27 the bus. The SBA immediately grants the PCI bus 200 to the next priority user such as any other agents 204 and isolates the bus in accordance with the data class being transferred.

All known standard computer buses have data lines that can be readily blocked with bus transceivers 23, 24 and 25. All computer buses employ bus arbitration schemes that can be readily intercepted and overlaid with data class-system element associations.

Therefore, the SBA applies to virtually any standard bus including PCI, personal computer memory card international association (PCMCIA) forms and versa module europe (VME). This permits the SBA of the present invention to provide data security in a wide variety of commercial architectures.

The need to associate data classes with computer subsystem elements and to isolate data classes from non-associated computer subsystem elements in accordance with a static or dynamic set of association rules in a multiprocessor subsystem employing commercially available computer devices led to this improvement.

This combines the use of ordinary bus transceivers for accomplishing the isolation of non-associated computer system elements from interaction with the transfer of a given class of data. These bus transceivers are controlled either by a hardware or software based Secure bus arbiter (SBA).

Figure 3:
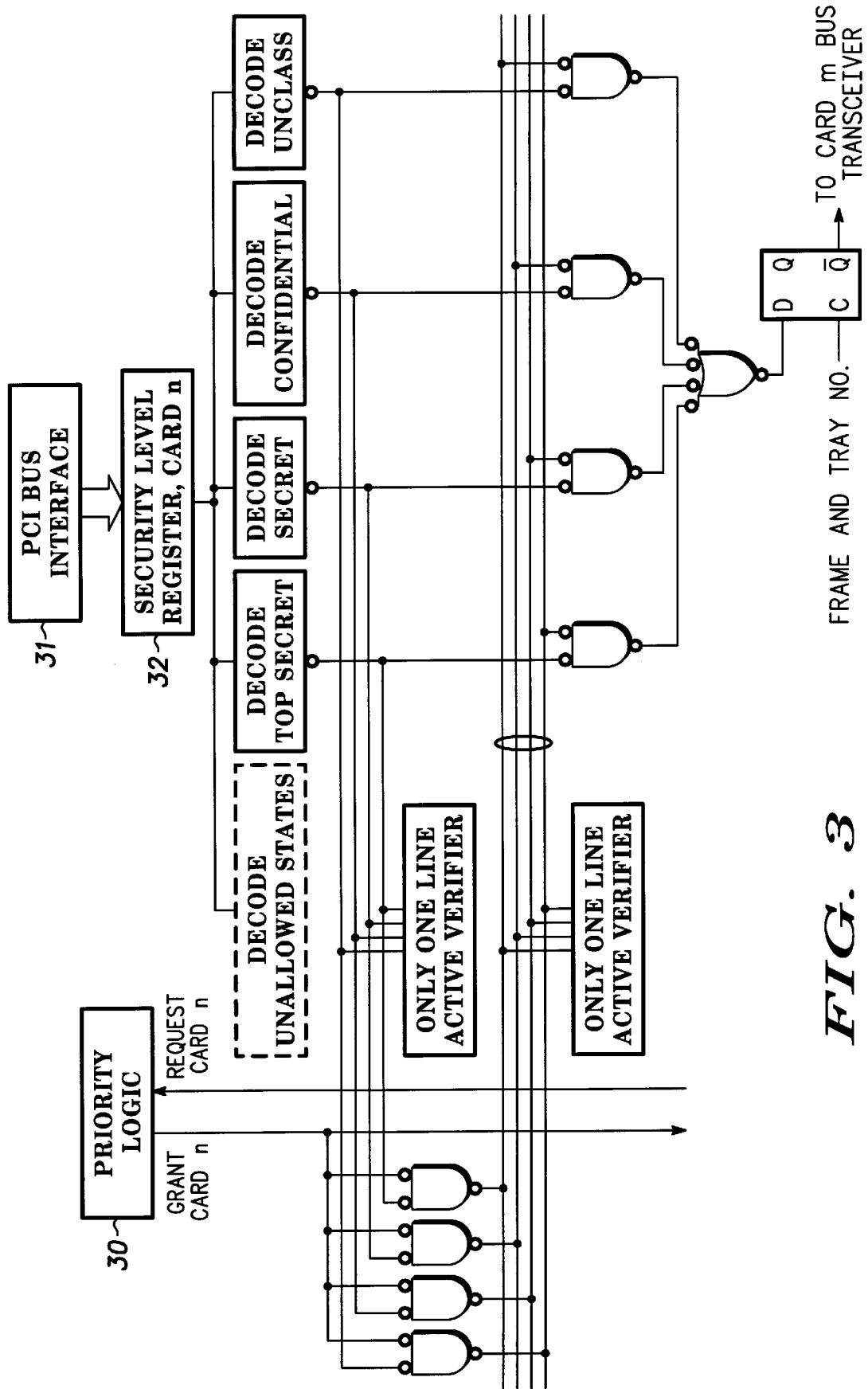
FIG. 3 is a schematic that presents circuitry for one type of bus arbiter interconnect module in accordance with the present invention.

FIG. 3 shows the priority logic 30 hardware that the SBA employs for enabling transceivers to enable the PCI bus interface 31 to a given device. The logic is based on a security level register 32 for card number N. The register contents are programmed by a trusted computer system element.

The SBA of the present invention employs a trusted computer or microprocessor system having sufficient discrete input and output (I/O) to control the isolation transceivers along with logic for implementing the system element-data class associations either statically or dynamically. The SBA module is incorporated as part of the trusted system elements.

Figure 4:
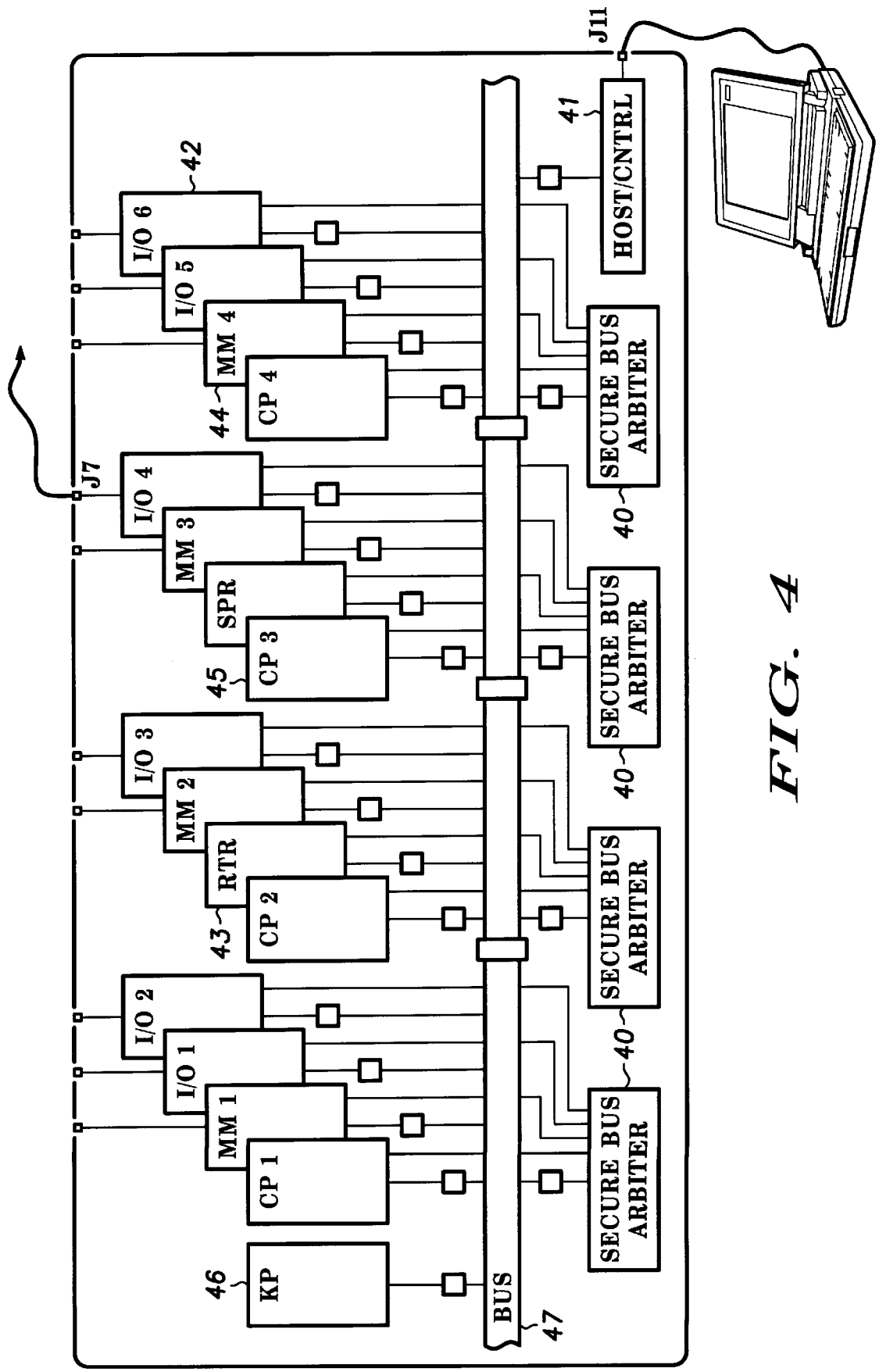
FIG. 4 is a view that illustrates printed circuit boards and one type of bus arbiter interconnect module to interface between a printed circuit boards in a computer chassis in accordance with the present invention.

FIG. 4 illustrates the secure bus arbitration process in accordance with the present invention. Data classes and their associations with computer system elements are determined by the trusted system element and used to control the secure bus arbiter or SBA 40.

The enable function can be static, taking place only upon initialization of the computer system by a host/control 41. It may also be dynamic while under the control of algorithms executed by the trusted computer system element.

The computer system element associations with data classes are combined by the SBA 40 with other bus management processes such as bus access priorities set by other, non-trusted system elements such as the computer system's main control function.

In a standard computer system, a system element must obtain use of the bus for transferring data to other system elements without the interference of other system elements during the process. Various schemes are employed by the different computer architectures in allocating the bus to its various system elements but all schemes provide some form of arbitration (from primitive dedicated priorities to highly elaborate algorithms) for any element of the system to access the bus.

The SBA 40 of the present invention overlays the arbitration scheme of any given bus with rules associating computer system elements with data classes for controlling the bus transceivers in the interfaces to all computer system elements. In this way, the present invention permits computer bus operations using the given architecture's standard arbitration protocols for all permitted bus interactions.

The present invention also denies interactions with system elements that are not permitted to be associated with and isolates non-associated system elements from contact with a given class of data transferred via the bus.

FIG. 4 provides an example of the use of the present invention in a computer system used primarily for the communication of data. Here, the computer is configured with a control subsystem, which might be the primary computer-human interface, six input or output (I/O) devices 42 for interfacing to digital systems such as ethernet, a router 43 for packetized data protocols, four multi-media subsystems 44 for voice coding, four cryptoprocessors (CP) 45 for data encryption, two modems at J7 and J11 for connection to wireless receiver/transmitters and an INFOSEC Controller for key management 46 as well as for critical control functions.

In this example, data is being input to Data I/O channel number four in plain-text form. Data is then passed securely over the data bus 47 to the router 43 where it is packetized and then delivered to CP number two for encryption and then delivered to modem one for modulation. Each leg of this data path requires a separate usage of the bus.

The present invention provides isolation of the data over the bus from all other computer elements not associated with this data class throughout its processing and transfer through the system. This physically isolates the single computer bus to a single data class for a given data transfer thereby insulating it from devices associated with any other data class.

Ordinary bus transceivers embedded in the data lines (and address lines, if required) of each computer system element's bus interface act as switches closing along a permitted path and opening to prevent eavesdropping by devices not associated with the permitted path.

Control of the bus transceiver switches is accomplished by the secure bus arbiters (SBA) 40. Control circuitry in the SBA may be embedded into the bus backbone or may be incorporated into a standard computer system element.

However, the bus transceiver controls are accessible only to the SBA 40. The SBA is configured to act in accordance with rules of association between computer system elements and data classes by a trusted system element. The information security (INFOSEC) controller is used to drive the SBA 40.

The SBA of the present invention works under the control of a trusted kernel and operating system. This serves as an extension of the trusted operating system throughout the entire computer bus preventing other untrusted processors or devices from compromising classified or sensitive data.

Potential applications for this invention include all computer applications in which it is imperative that various classes of data remain isolated from one another. This is certainly the case in handling various levels of classified data (unclassified, confidential, secret, top secret, compartmentalized) within a multi-processor computing system.

Here, a multi-level security (MLS) computer or communications system could interface to networks, data sources, voice or video data devices or wireless media each at different levels of classification, physically isolating its computer system elements that handle each type of data from other elements not permitted to handle this data.

Figure 5:
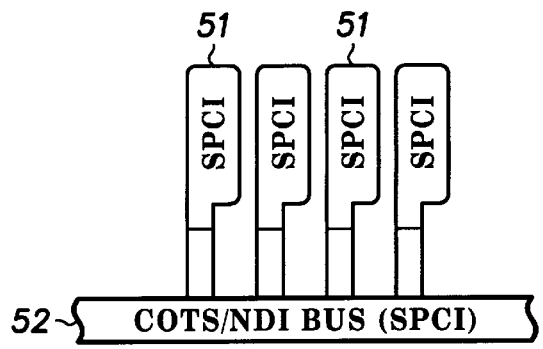
FIG. 5 illustrates prior art for printed circuit boards in a computer chassis.

FIG. 5 illustrates prior art for interface of small peripheral component interconnect (SPCI) cards 51 in a bus using a backplane or motherboard. The bus is typically a commercial off the shelf (COTS) item or a non-developmental item (NDI) 52. The bus meets the standards for SPCI cards.

Figure 6:
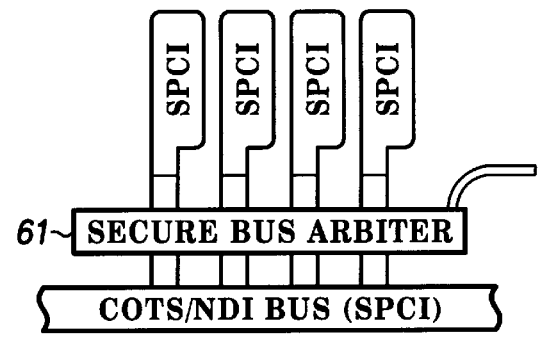
FIG. 6 is a schematic view that illustrates printed circuit boards and one type of single bus arbiter interconnect module to interface between many printed circuit boards and a computer bus or motherboard in accordance with the present invention.

FIG. 6 shows the incorporation of a single board with connectors as a bus arbiter interconnector 61. This would provide isolation between the SPCI cards and the COTS/NDI bus, but would be difficult to physically implement and use.

Figure 7:
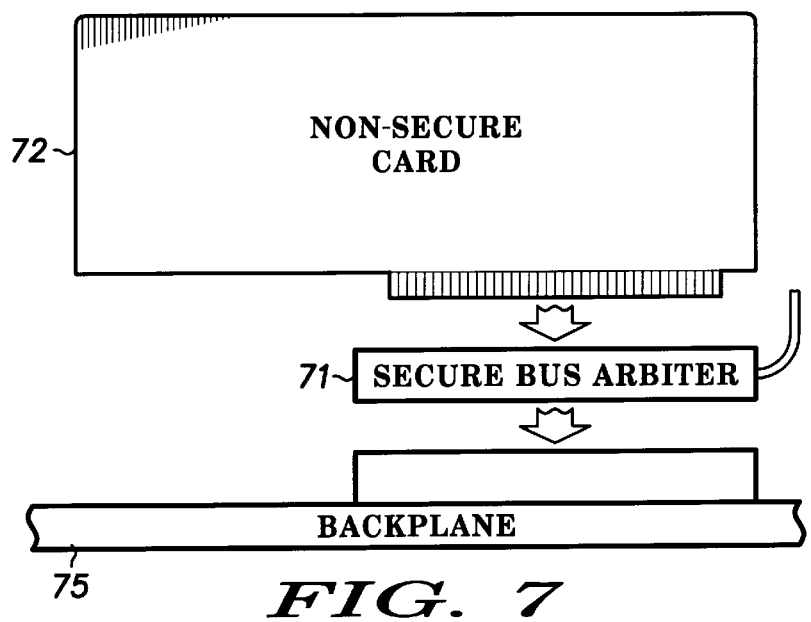
FIG. 7 illustrates a commercial off the shelf (COTS) type printed circuit board and one type of bus arbiter interconnect module to interface between a single, large format printed circuit board and a computer bus in accordance with the present invention.

FIG. 7 shows a type of secure bus arbiter module 71 used with a large card format meeting standards for PCI, ISA, and EISA 72, with a COTS/NDI backplane 75.

Figure 8:
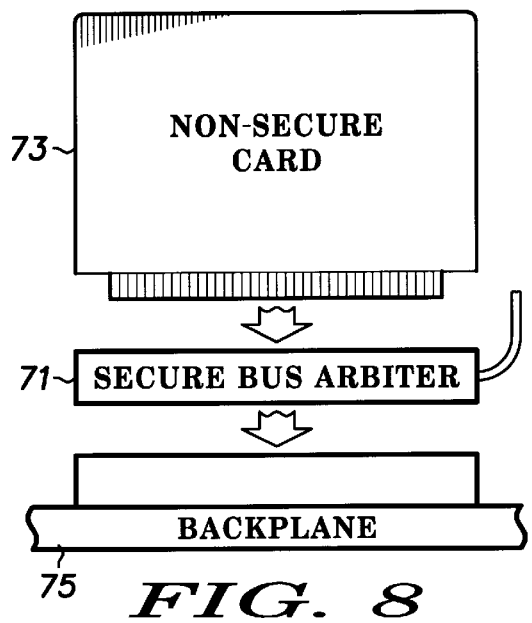
FIG. 8 illustrates a commercial off the shelf (COTS) printed circuit board and one type of bus arbiter interconnect module to interface between a single, Eurocard format printed circuit board and a computer bus in accordance with the present invention.

FIG. 8 shows a type of secure bus arbiter module 71 used with a Eurocard card format meeting standards for 3U, 6U, and VME 73, etc. with a COTS/NDI backplane 75.

Figure 9:
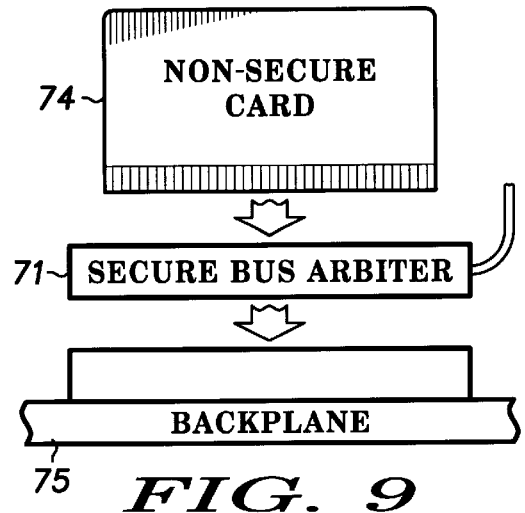
FIG. 9 illustrates a commercial off the shelf (COTS) printed circuit board and one type of bus arbiter interconnect module to interface between a single, small format printed circuit board and a computer bus in accordance with the present invention.

FIG. 9 shows a type secure bus arbiter module 71 used with a small card meeting form factor standards for PCMCIA 74 with a COTS/NDI backplane 75.

Another area that would benefit from isolation of the classes of data includes financial type computing systems. The SBA of the present invention prevents users using the resources of a multiprocessing computer system for one class of data that might be one client's financial records, from accessing or affecting the records of another user's of the same computer system's resources.

Figure 10:
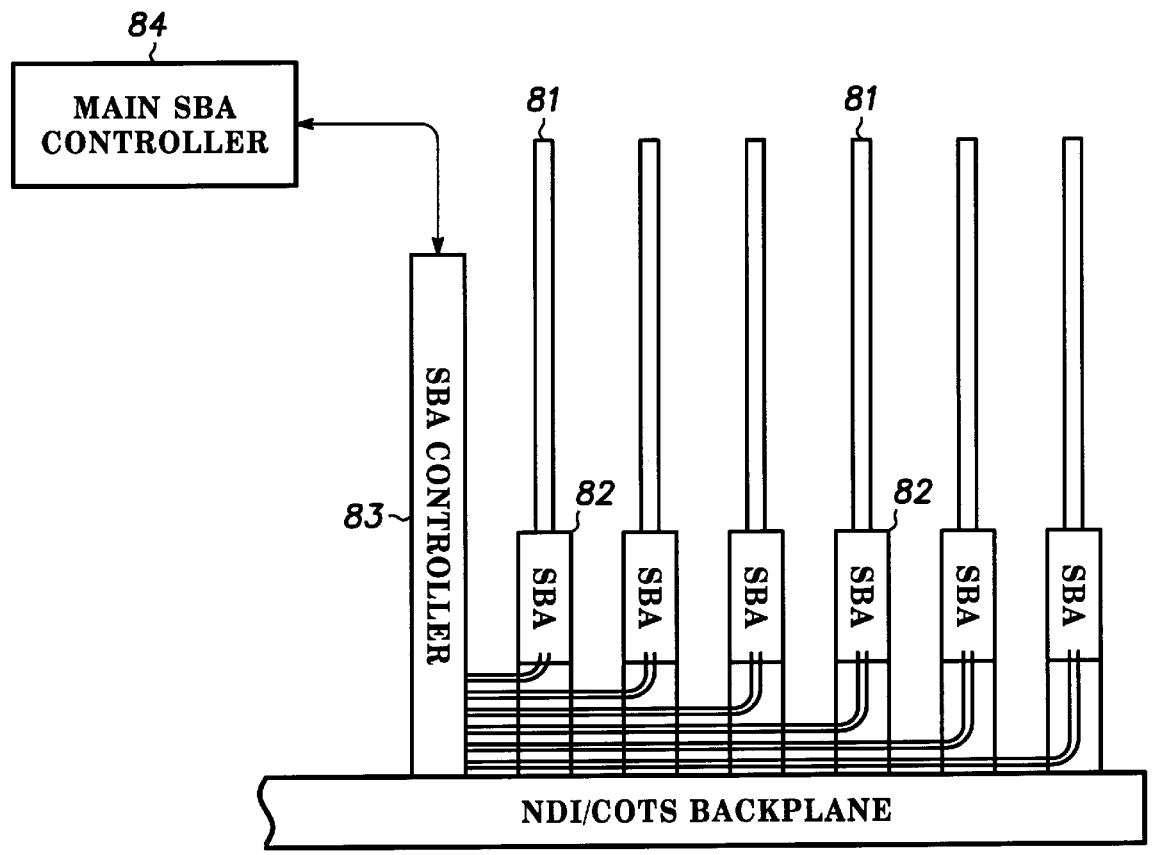
FIG. 10 is a schematic that illustrates various commercial off the shelf (COTS) printed circuit boards and one type of bus arbiter interconnect module to interface between a number of printed circuit boards and a computer chassis in accordance with the present invention.

FIG. 10 illustrates the use of the modules from FIGS. 7, 8 and 9 to individually control an array of cards such as in a financial multiprocessing computer. The non secure cards 81 are simply plugged into the SBA modules 82. An SBA satellite controller 83 provides individual control of the SBA modules 82 for access to sensitive data. The SBA satellite controller 83 is under the main SBA controller 84.

Safety-related computing, communications and control systems could also benefit from this configuration. Critical commands or messages that must be prevented from corruption or interception by any other elements of the system are protected by the present invention. Aircraft companies and other transportation computing systems, nuclear power computer system controls and medical computing systems could all utilize the data isolation and integrity assurance provided.

Modern electronics are being designed with 'plug and play' printed circuit boards and motherboards. This concept enables computers to be designed, updated, upgraded or expanded readily by the addition of ready to use circuit boards.

These commercial off the shelf (COTS) backplanes and printed circuit boards are being used in a variety of computer and digital signal processor applications. Many of the COTS backplanes and circuit boards are non-developmental items (NDI). These NDI motherboards and printed circuit boards are often used in a standardized packaging scheme in a computer chassis.

The majority of COTS computer printed circuit boards are used in PC applications where the printed circuit boards are connected to a motherboard in a computer chassis. Included in COTS circuit boards, for example, are boards for personal computers such as peripheral component interconnect (PCI) circuit boards, industry standard architecture (ISA) and extended ISA (EISA) circuit boards.

Other examples of COTS circuit board form factors are those meeting Eurocard unit standards such as 3 U or three Eurocard units and 6 U or six Eurocard units such as versa module europe (VME), compact peripheral component interconnect (cPCI) and other types. Another example of COTS boards would be those cards that follow the personal computer memory card international association (PCMCIA) form factor such as card bus, PC card and other types.

Each of these boards could be a different configuration and would require different treatment in the motherboard for providing secure functions. Modification of existing computer motherboards to incorporate a secure bus arbiter function would be a major undertaking. The present invention provides a secure bus arbiter that is useable with all commercial off the shelf computer motherboards and backplanes. This would aid in being able to readily provide security with data lines for classified or sensitive data both when designing new data processors and especially for computers already in use.

While specific embodiments of the present invention have been shown and described, it will be apparent to those skilled in the art that the disclosed invention can be modified in numerous ways and can assume many embodiments other than the preferred form specifically set out and described above. Accordingly, it is intended by the appended claims to cover all modifications of the invention that fall within the true spirit and scope of the invention.

Although the preferred embodiment of the present invention has been illustrated, and that form described in detail, it will be readily apparent to those skilled in the art that various modifications may be made therein without departing from the spirit of the invention or from the scope of the appended claims.

What is claimed is:

1. A bus secure arbiter interconnect arrangement for control of communication among a plurality of processor units comprising:

a bus for transmitting data among said plurality of processor units;

each of said plurality of processor units transmitting data of different classes to others of said plurality of processor units, each of said plurality of processor units being coupled to said bus;

a plurality of bus transceivers, each bus transceiver of said plurality of bus transceivers corresponding to one of said plurality of processor units;

each of said plurality of bus transceivers for controlling access to said bus by said plurality of bus transceivers corresponding to one of said plurality of processor units;

each of said plurality of bus transceivers coupled to one of a corresponding plurality of processor units;

a secure bus arbiter interconnect module for determining whether a first processor unit may receive a particular class of said different classes of data transmitted by a second processor unit, said secure bus arbiter interconnect module coupled to said bus and to a corresponding one of said plurality of bus transceivers; and said secure bus arbiter interconnect module is a secure bus arbiter and is controlled by a main secure bus arbiter controller.

2. A secure bus arbiter interconnect arrangement as claimed in claim 1 wherein said main secure bus arbiter controller includes logic to allow and deny data access to a data processor.

3. A secure bus arbiter interconnect arrangement as claimed in claim 2 wherein said data processor includes a connection to said secure bus arbiter interconnect module.

4. A secure bus arbiter interconnect arrangement as claimed in claim 3 wherein said connection of said data processor and said secure bus arbiter interconnect module is compatible with a personal computer, an industrial computer, a work station and an other computer type.

5. A secure bus arbiter interconnect arrangement as claimed in claim 4 wherein there is further included a printed circuit board that includes said data processor, said printed circuit board connected to said secure bus arbiter interconnect module.

6. A secure bus arbiter interconnect arrangement as claimed in claim 5 wherein said printed circuit board comprises a standard format printed circuit card including:

versa module europe (VME);

other cards using 3 U or 3 Eurocard units;

6 U or 6 Eurocard units; and any other printed circuit boards that have a format that is used as a standard.

7. A secure bus arbiter interconnect arrangement as claimed in claim 5 wherein said printed circuit board comprises a small, standard format printed circuit card.

8. A secure bus arbiter interconnect arrangement as claimed in claim 5 wherein said printed circuit board comprises a large, standard format printed circuit card.

9. A secure bus arbiter interconnect arrangement as claimed in claim 8 wherein said large, standard format printed circuit card includes:

a peripheral component interconnection (PCI) card;

an industry standard architecture (ISA) card;

an extended ISA card; and any other printed circuit boards that have a large board format.

10. A secure bus arbiter interconnect arrangement for control of communication among a plurality of processor units comprising:

a bus for transmitting data among said plurality of processor units;

each of said plurality of processor units transmitting data of different classes to others of said plurality of processor units, each of said plurality of processor units being coupled to said bus;

a plurality of bus transceivers, each bus transceiver of said plurality of bus transceivers corresponding to one of said plurality of processor units;

each of said plurality of bus transceivers for controlling access to said bus by said plurality of bus transceivers corresponding to one of said plurality of processor units;

each of said plurality of bus transceivers coupled to one of a corresponding plurality of processor units;

a plurality of secure bus arbiter interconnect modules for determining whether ones of said plurality of processor units may receive particular class of said different classes of data transmitted by others of said plurality of processor units, each of said plurality of bus arbiter interconnect modules coupled to said bus and to a corresponding one of said plurality of bus transceivers; and said plurality of secure bus arbiter modules are controlled by a main secure bus arbiter interconnect module controller.

11. A secure bus arbiter interconnect arrangement as claimed in claim 10 wherein each of said plurality of bus transceivers is coupled to one each of said plurality of secure bus arbiter modules.

12. A secure bus arbiter interconnect arrangement as claimed in claim 11 wherein said data bus or processor includes a connection to said plurality of bus arbiter interconnect modules.

13. A secure bus arbiter interconnect arrangement as claimed in claim 12 wherein said connection of said data bus or processor and said secure bus arbiter interconnect module is compatible with a personal computer, an industrial computer, a work station or an other type computer.

14. A secure bus arbiter interconnect arrangement as claimed in claim 13 wherein there is further included a printed circuit board which includes said data bus or processor, said printed circuit board connected to said secure bus arbiter interconnect module.

15. A secure bus arbiter interconnect arrangement as claimed in claim 10 wherein said main secure bus arbiter interconnect module controller includes logic to allow and deny data access to a data bus or processor.

16. A secure bus arbiter interconnect arrangement as claimed in claim 10 wherein said plurality of processor units that plugs into said plurality of bus arbiter interconnect modules includes:

said plurality of processor units on printed circuits;

a small, standard format printed circuit card such as a personal computer memory card international association (PCMCIA) card or smart card;

a large, standard format printed circuit card such as a peripheral component interconnection (PCI) card or industry standard architecture (ISA) card or extended ISA card and any other printed circuit boards that have a large format;

a standard format printed circuit card such as versa module europe (VME), and other cards using a 3 U or 3 Eurocard units, a 6 U or 6 Eurocard units; and any printed circuit boards that have a format that is used as a standard.

* * * * *